(12) United States Patent
Furukawa et al.

(10) Patent No.: US 11,230,183 B2
(45) Date of Patent: Jan. 25, 2022

(54) VEHICLE DRIVE SYSTEM

(71) Applicant: Mazda Motor Corporation, Hiroshima (JP)

(72) Inventors: Akihiro Furukawa, Aki-gun (JP); Seiyo Hirano, Aki-gun (JP); Hideki Sanai, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 86 days.

(21) Appl. No.: 16/882,779

(22) Filed: May 26, 2020

(65) Prior Publication Data

US 2020/0376949 A1 Dec. 3, 2020

(30) Foreign Application Priority Data

Jun. 3, 2019 (JP) .............................. JP2019-103840

(51) Int. Cl.

| B60K 6/46 | (2007.10) |
| B60K 6/26 | (2007.10) |
| B60K 6/28 | (2007.10) |
| B60K 6/40 | (2007.10) |
| B60R 16/033 | (2006.01) |
| B60K 6/52 | (2007.10) |
| B60K 7/00 | (2006.01) |

(52) U.S. Cl.
CPC ............... *B60K 6/46* (2013.01); *B60K 6/26* (2013.01); *B60K 6/28* (2013.01); *B60K 6/40* (2013.01); *B60R 16/033* (2013.01); *B60K 6/52* (2013.01); *B60K 7/0007* (2013.01); *B60K 2007/0061* (2013.01); *B60Y 2200/92* (2013.01); *B60Y 2400/112* (2013.01); *B60Y 2400/61* (2013.01); *B60Y 2410/115* (2013.01)

(58) Field of Classification Search
CPC ... B60K 6/46; B60K 6/26; B60K 6/28; B60K 6/40; B60K 6/52; B60K 7/0007; B60K 2007/0061; B60R 16/033; B60Y 2200/92; B60Y 2400/112; B60Y 2400/61; B60Y 2410/115
See application file for complete search history.

(56) References Cited

U.S. PATENT DOCUMENTS

| 2004/0061503 A1* | 4/2004 | Morimoto | ............. B60L 3/0046 324/418 |
| 2010/0004843 A1* | 1/2010 | Yu | ......................... B60W 10/06 701/102 |
| 2011/0087395 A1* | 4/2011 | Yamamoto | .............. B60L 53/14 701/22 |

(Continued)

FOREIGN PATENT DOCUMENTS

JP 2018-026973 A 2/2018

*Primary Examiner* — Erez Gurari
(74) *Attorney, Agent, or Firm* — Xsensus LLP

(57) ABSTRACT

A vehicle drive system includes: a primary drive motor and a secondary drive motor; a battery; a capacitor that is connected in-series with the battery; a first power line that supplies a total aggregate voltage of the battery and the capacitor; a second power line that supplies a battery voltage; and a third power line that supplies a cell voltage. The first power line, the second power line, and the third power line are configured such that the battery voltage is higher than the cell voltage and that the total voltage is higher than the battery voltage.

19 Claims, 6 Drawing Sheets

(56) References Cited

U.S. PATENT DOCUMENTS

| | | | | |
|---|---|---|---|---|
| 2011/0125294 | A1* | 5/2011 | Yu | B60K 6/28 |
| | | | | 700/33 |
| 2012/0139487 | A1* | 6/2012 | Kim | H02J 1/108 |
| | | | | 320/109 |
| 2013/0096759 | A1* | 4/2013 | Breton | B60K 6/485 |
| | | | | 701/22 |
| 2015/0008734 | A1* | 1/2015 | Ishida | F02N 11/0866 |
| | | | | 307/10.1 |
| 2017/0256957 | A1* | 9/2017 | Buiel | H02M 3/04 |
| 2017/0267103 | A1* | 9/2017 | Nomura | H02J 7/14 |
| 2018/0029473 | A1* | 2/2018 | Nishimura | B60W 10/115 |
| 2018/0287601 | A1* | 10/2018 | Yang | H03K 17/041 |
| 2018/0326861 | A1* | 11/2018 | Poirier | B60L 50/40 |
| 2019/0312456 | A1* | 10/2019 | Iwasaki | H02J 7/0068 |
| 2020/0114901 | A1* | 4/2020 | Oyama | B60K 6/48 |
| 2020/0195035 | A1* | 6/2020 | Cheong | H02M 3/158 |
| 2020/0247340 | A1* | 8/2020 | Furukawa | B60L 50/66 |
| 2020/0376949 | A1* | 12/2020 | Furukawa | B60K 6/46 |
| 2020/0376967 | A1* | 12/2020 | Furukawa | B60L 50/61 |
| 2021/0008971 | A1* | 1/2021 | Toda | B60K 6/24 |

\* cited by examiner

VEHICLE DRIVE SYSTEM

CROSS-REFERENCE TO RELATED APPLICATION

The present application claims priority to JP 2019-103840, filed Jun. 3, 2019, the entire contents of which are incorporated herein by reference.

TECHNICAL FIELD

The present disclosure relates to a vehicle drive system and, in particular, to a vehicle drive system that supplies at least three power supply voltages, magnitudes of which differ, to drive a vehicle.

BACKGROUND ART

A vehicular power supply device is described in JP-A-2018-26973 (Patent document 1). This vehicular power supply device provides a high-voltage power supply (36 V) to a vehicle drive system (including a motor), and provides a low-voltage power supply (12 V) to an electrical load. In this vehicular power supply device, 12 power storage elements are connected in series. Each of the power storage elements is a three-volt lithium-ion battery. The high-voltage power supply is provided by this series circuit. The low-voltage power supply is provided by a series circuit of 4 power storage elements that are selected from the 12 power storage elements by a switch. In this vehicular power supply device, step-down conversion of the high-voltage power supply is unnecessary for provision of the low-voltage power supply. Thus, power loss that is caused by the step-down conversion can be reduced.

PRIOR ART DOCUMENTS

Patent Documents

[Patent document 1] JP-A-2018-26973

SUMMARY

Problems to be Solved by the Disclosure

However, as recognized by the present inventors, the vehicular power supply device in Patent document 1 simply supplies the two power supply voltages, and cannot also supply power to a load that requires a voltage higher than that of the high-voltage power supply. According to Patent document 1, in order to provide a higher voltage power supply, it is necessary to increase the number of the power storage elements or additionally provide an expensive, and more complex DC/DC converter. Such a change produces problems of increased vehicle weight, increased cost, and increased circuit complexity, which in turn lows system reliability.

Therefore, one aspect of the present disclosure is to provide a vehicle drive system that is lightweight, has a simple configuration, and supplies at least three power supply voltages.

Means for Solving the Problems

In order to solve the above-described and other problems, the present disclosure describes a vehicle drive system mounted on a vehicle, and includes: a first vehicle drive motor and a second vehicle drive motor; a battery that includes plural battery cells connected in series; a capacitor that is connected in series with the battery; a first power line that supplies a battery voltage supplied from the battery to a first vehicle drive motor; and a second power line that supplies to a second vehicle drive motor a total aggregate voltage of the battery voltage and a capacitor voltage supplied from the capacitor; a third power line that supplies a cell voltage of at least one battery cell of the plural battery cells to on-board electrical equipment of the vehicle, wherein the battery voltage being higher than the cell voltage, and the total aggregate voltage being higher than the battery voltage.

In the present disclosure that is configured as described above, a power supply includes the in-series connection between the battery and the capacitor, and also includes: the first power line connected to the capacitor; the second power line connected to the battery; and the third power line for supplying the cell voltage from the at least one battery cell in the battery. The second power line is directly provided by the battery, and the third power line is directly provided by the at least one battery cell in the battery. Furthermore, the first power line is provided by the total voltage of the battery and the capacitor. Just as described, in the present disclosure, a DC/DC converter does not have to be provided, and three power supply voltages can be supplied with the easy and simple configuration.

In the present disclosure, the first vehicle drive motor is preferably an in-wheel motor that is mounted on a wheel of the vehicle. According to the present disclosure that is configured as described above, the first vehicle drive motor can be actuated by a high voltage that is the total voltage of the battery and the capacitor. Just as described, in the present disclosure, there is no need to obtain a high voltage by boosting the battery voltage by the DC/DC converter.

In the present disclosure, the second vehicle drive motor is preferably mounted on a body of the vehicle and provides drive power to the wheel of the vehicle via a power transmission mechanism. According to the present disclosure that is configured as described above, the second vehicle drive motor can be actuated by the battery that can easily be designed to have larger capacity as the power supply than the capacitor.

In the present disclosure, the third power line is preferably an accessory power supply. According to the present disclosure that is configured as described above, the cell voltage that is provided by the at least one battery cell in the battery can be used as the accessory power supply. Just as described, in the present disclosure, there is no need to obtain a low voltage by dropping the battery voltage by the DC/DC converter.

In the present disclosure, the third power line is preferably provided with a switch that is used to electrically connect/disconnect the at least one battery cell to/from the on-board electrical equipment. According to the present disclosure that is configured as described above, it is possible to electrically connect/disconnect the at least one battery cell to/from the on-board electrical equipment with the simple configuration.

Advantages of the Disclosure

The vehicle drive system according to the present disclosure can be lightweight, have a simple configuration, and supply the at least three power supply voltages.

MODES FOR CARRYING OUT THE DISCLOSURE

Figure 1:
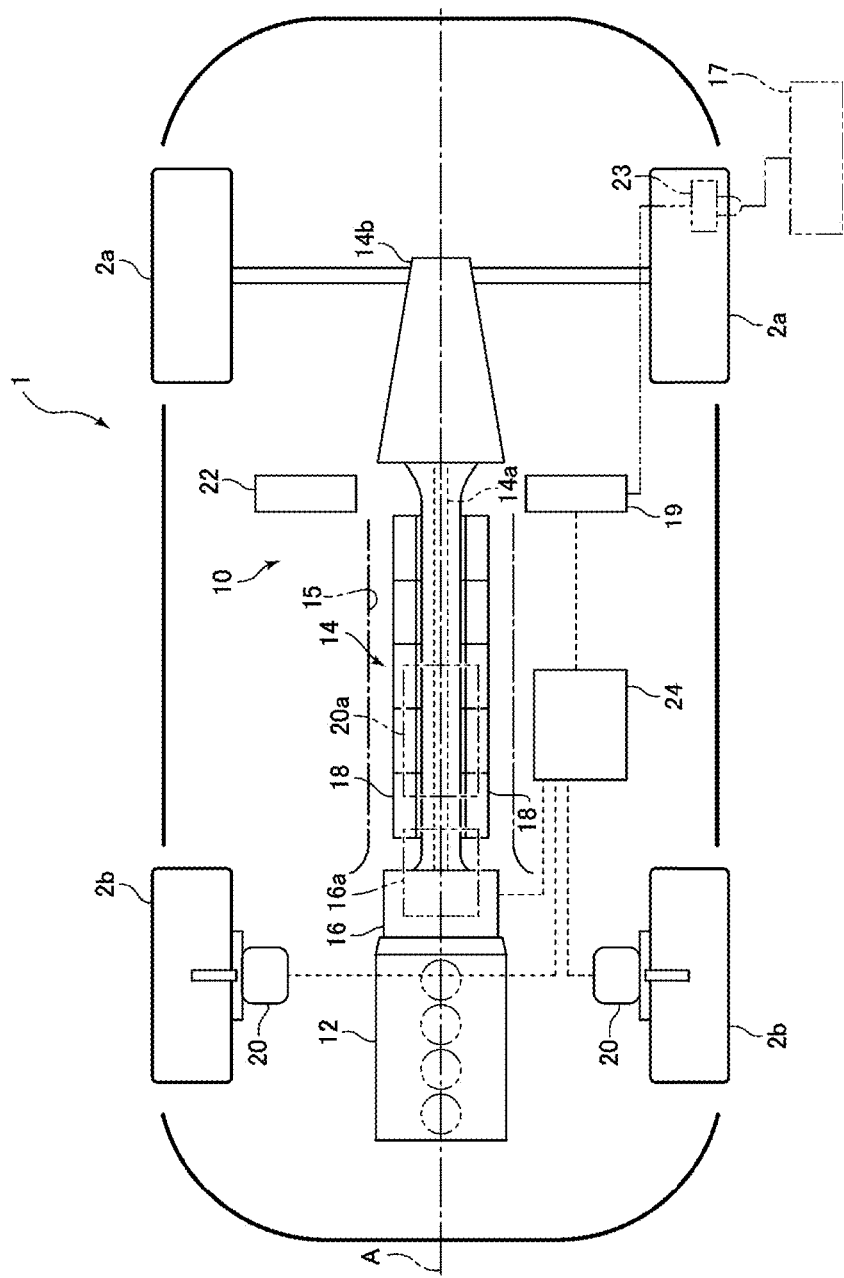
FIG. 1 is a layout view of a vehicle on which a vehicle drive system according to an embodiment of the present disclosure is mounted.
Figure 2:
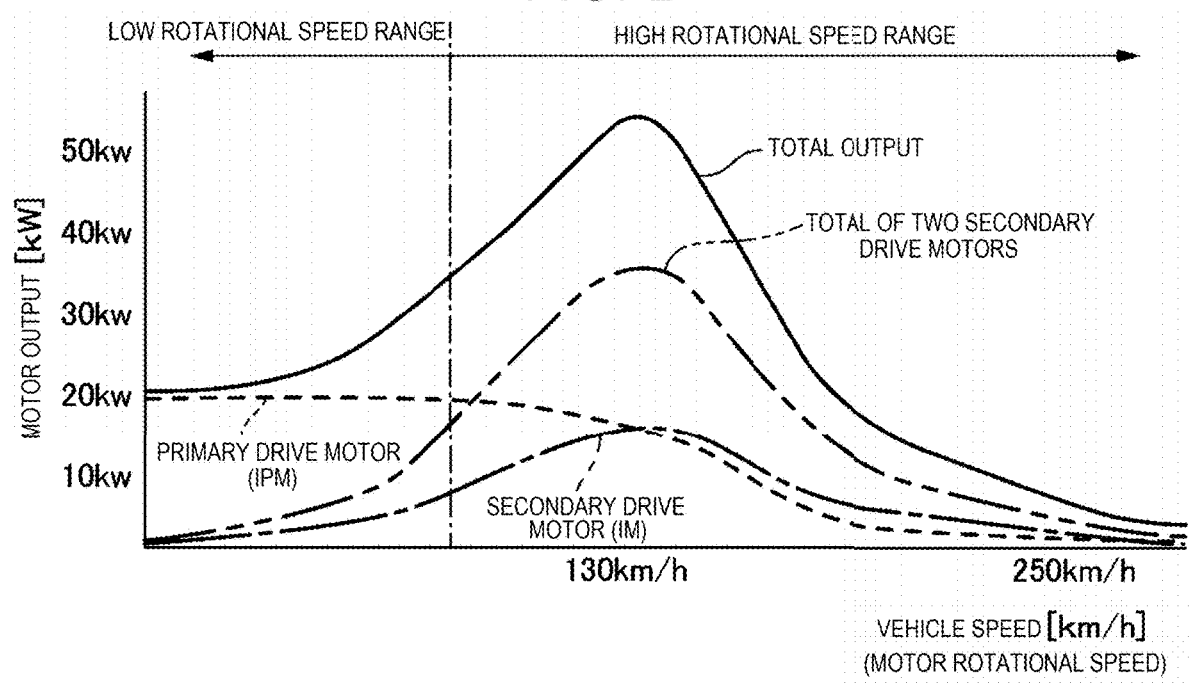
FIG. 2 is a graph illustrating a relationship between output of each motor in the vehicle drive system according to the embodiment of the present disclosure and a vehicle speed.

An embodiment of the present disclosure will be described with reference to the accompanying drawings. First, a description will be made on a configuration of a vehicle drive system according to the embodiment of the present disclosure with reference to FIG. 1, and FIG. 2. FIG. 1 is a layout view of a vehicle on which the vehicle drive system is mounted, and FIG. 2 is a graph illustrating a relationship between output of each motor in the vehicle drive system and a vehicle speed.

As illustrated in FIG. 1, a vehicle 1 on which a vehicle drive system 10 according to an embodiment of the present disclosure is mounted is a so-called front-engine, rear-drive (FR) vehicle in which an engine 12 as an internal combustion engine is mounted in a front portion of the vehicle in front of a driver's seat and a pair of right and left rear wheels 2a as primary drive wheels are driven.

The vehicle drive system 10 according to the embodiment of the present disclosure includes: a primary drive motor 16 that drives the pair of rear wheels 2a; secondary drive motors 20 that drive a pair of front wheels 2b; a power supply 3 (a battery 18 and a power supply capacitor 22) that supplies power to these motors; a charging circuit 19; and a control circuit 24.

The engine 12 is an internal combustion engine that generates drive power for the rear wheels 2a as the primary drive wheels of the vehicle 1. In this embodiment, an in-line four-cylinder engine is adopted as the engine 12, and the engine 12, which is arranged in the front portion of the vehicle 1, drives the rear wheels 2a via a power transmission mechanism 14.

The power transmission mechanism 14 is configured to transmit the drive power, which is generated by the engine 12 and the primary drive motor 16, to the rear wheels 2a as the primary drive wheels. As illustrated in FIG. 1, the power transmission mechanism 14 includes: a propeller shaft 14a that is a power transmission shaft connected to the engine 12 and the primary drive motor 16; and a transmission 14b as a gearbox.

The primary drive motor 16 is an electric motor that generates the drive power for the primary drive wheels, is provided on a body of the vehicle 1, and is arranged adjacent to the engine 12 at a position behind the engine 12. An inverter 16a is arranged adjacent to the primary drive motor 16. This inverter 16a converts a DC voltage of the battery 18 to an AC voltage, and supplies the AC voltage to the primary drive motor 16. Furthermore, as illustrated in FIG. 1, the primary drive motor 16 is connected in series with the engine 12, and the drive power generated by the primary drive motor 16 is also transmitted to the rear wheels 2a via the power transmission mechanism 14. In this embodiment, a permanent magnet motor (a permanent magnet synchronous motor) of 25 kW that is driven at a relatively low voltage (in this embodiment, equal to or lower than 48 V) is adopted as the primary drive motor 16.

The secondary drive motor 20 is provided for each of the front wheels 2b so as to generate the drive power for the respective front wheels 2b as a secondary drive wheel. The secondary drive motor 20 is an in-wheel motor and is accommodated in a wheel rim of each of the front wheels 2b. A DC voltage of the capacitor 22 is converted to an AC voltage by an inverter 20a that is arranged in a tunnel section 15, and is supplied to each of the secondary drive motors 20. Furthermore, in this embodiment, each of the secondary drive motors 20 is not provided with a reducer as a deceleration mechanism. The drive power of each of the secondary drive motors 20 is directly transmitted to the respective front wheels 2b, and thus the wheels are directly driven. Moreover, in this embodiment, an induction motor of 17 kW that is driven at a relatively high voltage (in this embodiment, equal to or lower than 120 V) is adopted as each of the secondary drive motors 20.

Figure 3:
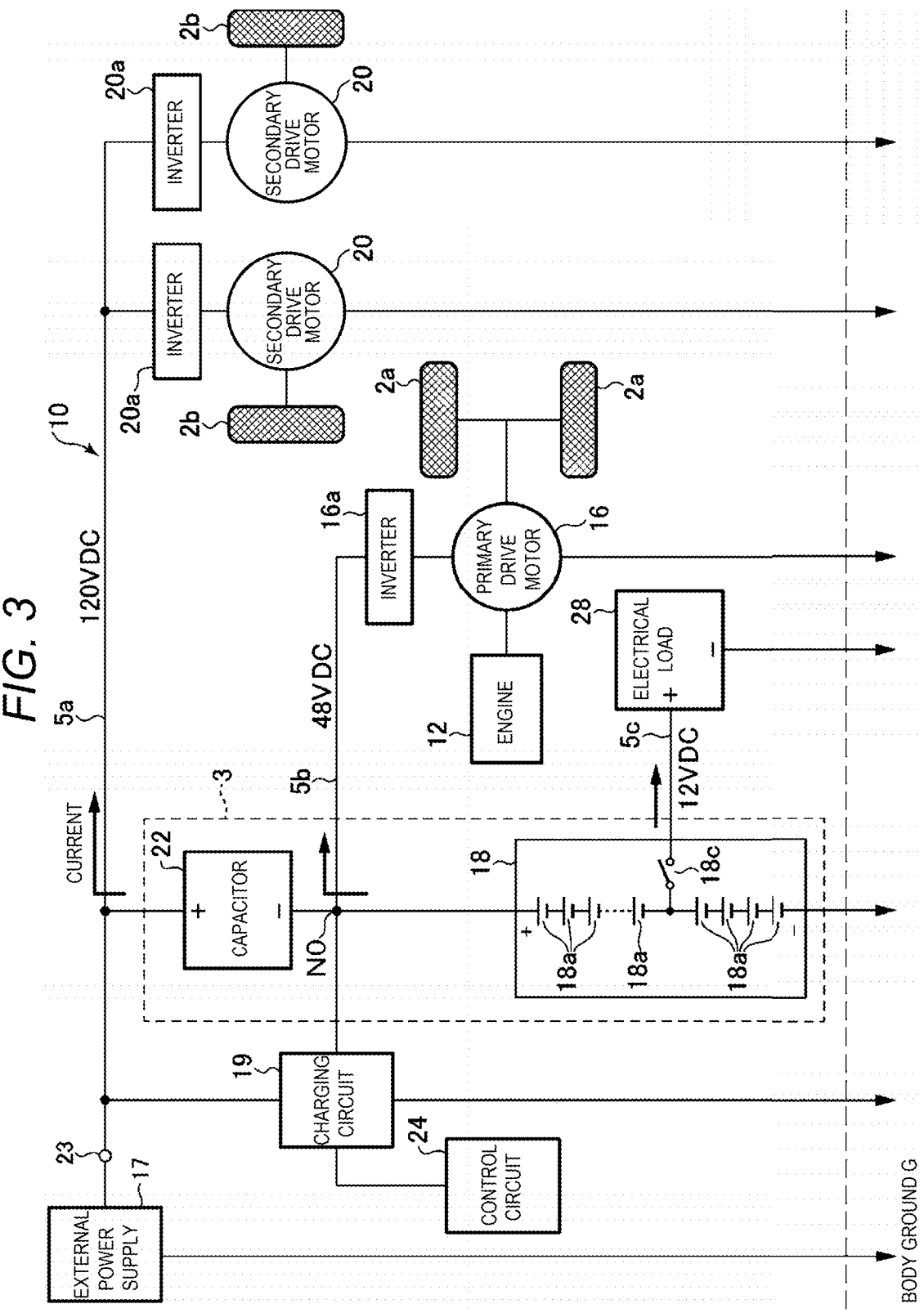
FIG. 3 is an electric block diagram of the vehicle drive system according to the embodiment of the present disclosure.

The power supply 3 is configured by connecting the battery 18 and the capacitor 22 in series (see FIG. 3). More specifically, a negative electrode terminal of the battery 18 is connected to a body ground G of the vehicle 1, and a positive electrode terminal of the battery 18 is connected to a negative electrode terminal of the capacitor 22.

The battery 18 is a power storage device that stores electrical energy for primarily actuating the primary drive motor 16. In this embodiment, a lithium-ion battery (LIB) of 48 V, 3.5 kWh is used as the battery 18. More specifically, the battery 18 is configured by connecting plural battery cells 18a (see FIG. 3) in series. In this embodiment, a rated voltage of each of the battery cells 18a is about 3 V, and 12 battery cells 18a are connected in series.

The capacitor 22 is a power storage device that supplies the power to the secondary drive motor 20 provided to each of the front wheels 2b of the vehicle 1. In a rear portion of the vehicle 1, the capacitor 22 is arranged at a substantially symmetrical position to the plug-in charging circuit 19. In this embodiment, the capacitor 22 has a withstand voltage of 72 V and electrostatic capacity of about several farads. Each of the secondary drive motors 20 is a motor that is driven at the higher voltage than the primary drive motor 16, and is primarily driven by the electrical energy stored in the capacitor 22.

The charging circuit 19 is electrically connected to the battery 18 and the capacitor 22. The charging circuit 19 is configured to charge the battery 18 and the capacitor 22 with regenerative power of the primary drive motor 16 and the secondary drive motors 20 as well as power supplied from an external power supply 17 such as a charging stand connected to a power supply port 23.

The power supply port 23 is a connector that is provided on a lateral surface in the rear portion of the vehicle 1, and is electrically connected to the charging circuit 19. The connector of the power supply port 23 is configured to be connectable to a plug of an electrical cable 17*a* that extends from the external power supply 17 such as the charging stand, and the power is supplied to the charging circuit 19 via the power supply port 23. Just as described, the vehicle drive system 10 in this embodiment is configured to be able to charge the battery 18 and the capacitor 22 by connecting the external power supply 17 for supplying the DC power to the power supply port 23 via the electrical cable 17*a*.

The control circuit 24 is configured to control the engine 12, the primary drive motor 16, and the secondary drive motors 20 so as to execute one of a motor travel mode and an internal combustion engine travel mode. The control circuit 24 is also configured to control the charging circuit 19 so as to charge/discharge the battery 18 and the capacitor 22. More specifically, the control circuit 24 can be constructed of a microprocessor, memory, an interface circuit, a program that actuates these components (none of them are illustrated), and the like. Moreover, the control circuit 24 includes one or more interconnected microprocessors that are configured by software stored in memory, and/or application specific circuits that are hardwired configured, and/or software configured to perform the processes described herein.

Next, FIG. 2 illustrates a relationship between the vehicle speed and output of each of the motors in the vehicle drive system 10. In FIG. 2, the output of the primary drive motor 16 is indicated by a broken line, the output of the single secondary drive motor 20 is indicated by a one-dot chain line, the total output of the two secondary drive motors 20 is indicated by a two-dot chain line, and the total output of all the motors is indicated by a solid line. In FIG. 2, a horizontal axis represents a speed of the vehicle 1, and a vertical axis represents the output of each of the motors. Due to a constant relationship between the speed of the vehicle 1 and a rotational speed of each of the motors, even when the motor rotational speed is set on the horizontal axis, the output of each of the motors exhibits a similar curve to that in FIG. 2.

In this embodiment, the permanent magnet motor is adopted as the primary drive motor 16. Thus, as indicated by the broken line in FIG. 2, in a low vehicle speed range where the motor rotational speed is low, the output of the primary drive motor 16 is large. Then, as the vehicle speed is increased, the motor output that can be output is reduced. More specifically, in this embodiment, the primary drive motor 16 is driven at about 48 V, outputs torque of about 200 Nm as maximum torque up to about 1000 rpm. At about 1000 rpm and higher, the torque is reduced along with an increase in the rotational speed. In addition, in this embodiment, the primary drive motor 16 is configured to enable continuous output at about 20 kW in the lowest speed range and to obtain the maximum output at about 25 kW.

Meanwhile, the induction motor is adopted as the secondary drive motor 20. Thus, as indicated by the one-dot chain line and the two-dot chain line in FIG. 2, the output of the secondary drive motor 20 is extremely small in the low vehicle speed range. As the vehicle speed is increased, the output thereof is increased. Then, after the secondary drive motor 20 generates the maximum output near the vehicle speed of about 130 km/h, the motor output is reduced. In this embodiment, the secondary drive motor 20 is configured to be driven at about 120 V and, near the vehicle speed of about 130 km/h, generate the output of about 17 kW per motor and the total output of about 34 kW by the two motors. That is, in this embodiment, the secondary drive motor 20 has a torque curve that peaks at about 600 to 800 rpm, and generates the maximum torque of about 200 Nm.

The solid line in FIG. 2 represents the total output of these primary drive motor 16 and two secondary drive motors 20. As it is apparent from this graph, in this embodiment, the maximum output of about 53 kW is obtained near the vehicle speed of about 130 km/h. With this maximum output at this vehicle speed, a travel condition requested for the WLTP test can be satisfied. In the solid line in FIG. 2, output values of the two secondary drive motors 20 are combined in the low vehicle speed range. However, in reality, each of the secondary drive motors 20 is not driven in the low vehicle speed range. More specifically, the vehicle is driven only by the primary drive motor 16 at a start and in the low vehicle speed range, and the output of the two secondary drive motors 20 is generated only when the large output is required in the high vehicle speed range (when the vehicle 1 is accelerated in the high vehicle speed range, or the like). Just as described, the induction motors (the secondary drive motors 20) capable of generating the large output in a high rotational speed range are only used in the high speed range. Thus, while an increase in vehicle weight is restrained, sufficient output can still be obtained when necessary (during acceleration at a specified speed or higher, or the like).

Next, a description will be made on an electric configuration of the vehicle drive system 10 according to the embodiment of the present disclosure with reference to FIG. 3. FIG. 3 is an electric block diagram of the vehicle drive system.

In this embodiment, the vehicle drive system 10 is configured to supply the three power supply voltages, magnitudes of which differ. More specifically, the vehicle drive system 10 is provided with: a first power line 5*a* for supplying the voltage of 120 V at a maximum; a second power line 5*b* for supplying the voltage of 48 V at a maximum; and a third power line 5*c* for supplying the voltage of 12 V at a maximum.

The first power line 5*a* is connected to a positive electrode terminal of the capacitor 22, and supplies the 120 VDC voltage to the secondary drive motors 20 via the inverters 20*a*. That is, with a total voltage of an inter-terminal voltage of the battery 18 and an inter-terminal voltage of the capacitor 22, a potential difference of 120 VDC at a maximum is generated between the positive electrode terminal of the capacitor 22 and the body ground G of the vehicle 1. The inverters 20*a*, which are connected to the respective secondary drive motors 20, convert the output of the battery 18 and the capacitor 22 to the AC voltage, and then drive the respective secondary drive motors 20 as the induction motor.

The second power line 5*b* is connected to the positive electrode terminal of a battery 18, and supplies the 48 VDC voltage to the primary drive motor 16 via the inverter 16*a*. That is, with the inter-terminal voltage of the battery 18, the potential difference of 48 VDC at the maximum is generated between the positive electrode terminal of the battery 18 and the body ground G of the vehicle 1. The inverter 16*a* converts the output of the battery 18 to the AC voltage, and then drives the primary drive motor 16 as the permanent magnet motor.

The third power line 5*c* is connected to a positive electrode terminal of a particular battery cell 18*a* among the plural battery cells 18*a* that are connected in series. More specifically, due to an in-series connection circuit of the specified number (four in this example) of the battery cells 18*a*, the potential difference of about 12 VDC is generated between the positive electrode terminal of this particular battery cell 18*a* and the body ground G of the vehicle 1. The third power line 5c is an accessory power supply, and supplies the 12 VDC voltage to an electrical load 28 of the vehicle 1 via a switch 18c. The electrical load is on-board electrical equipment (for example, an air conditioner, an audio device, or the like).

Just as described, the primary drive motor 16 is driven at about 48 V that is a reference output voltage of the battery 18. Meanwhile, since each of the secondary drive motors 20 is driven at the total voltage acquired by combining the output voltage of the battery 18 and the inter-terminal voltage of the capacitor 22, each of the secondary drive motors 20 is driven at the maximum voltage of 120 V that is higher than 48 V. The capacitor 22 stores the electrical energy to be supplied to the secondary drive motors 20, and each of the secondary drive motors 20 is always driven by the power that is supplied via the capacitor 22.

As illustrated in FIG. 3, the charging circuit 19 is connected to the positive electrode terminal of the capacitor 22, a connection point N0 between the positive electrode terminal of the battery 18 and the negative electrode terminal of the capacitor 22, and the body ground G. The control circuit 24 executes charging processing of the battery 18 and the capacitor 22 by using the charging circuit 19 in specified times (during regeneration of the motor, during external charging by the external power supply 17, and the like).

The control circuit 24 monitors the voltages and currents of the first power line 5a, the second power line 5b, and the third power line 5c by using plural voltage sensors and plural current sensors, which are not illustrated. By using these voltage values and current values, the control circuit 24 further calculates the inter-terminal voltage of the battery 18 (hereinafter referred to as a "battery voltage"), the inter-terminal voltage of the capacitor 22 (hereinafter referred to as a "capacitor voltage"), and states of charge (SOC) of these.

During deceleration of the vehicle 1, or the like, the primary drive motor 16 and the secondary drive motors 20 function as generators and regenerate kinetic energy of the vehicle 1 to generate the power. The power regenerated by the primary drive motor 16 is stored in the battery 18, and the power regenerated by each of the secondary drive motors 20 is primarily stored in the capacitor 22.

In the case where the external power supply 17 is used for charging, at the time when the external power supply 17 is connected to the power supply port 23, a charging voltage of the external power supply 17 is applied to the charging circuit 19 and the capacitor 22, which allows charging of the battery 18 and the capacitor 22.

The electrostatic capacity of the capacitor 22 is relatively small. Thus, when the capacitor 22 is charged by the regeneration of the motor or the external charging, the capacitor voltage is boosted relatively rapidly. When the capacitor voltage reaches a specified voltage by charging, the control circuit 24 controls the charging circuit 19 to charge the battery 18 by using electrostatic energy (electric charges) stored in the capacitor 22. As a result, the capacitor voltage is dropped, and thus the capacitor 22 can be charged again. By repeating such processing, the battery voltage can gradually be boosted. That is, the power regenerated by each of the secondary drive motors 20 and the power from the external power supply 17 are temporarily stored in the capacitor 22, and is then stored in the battery 18.

In general, the external power supply 17 such as the charging stand is configured to obtain the voltage of the vehicle (that is, a voltage-to-ground of the power supply port) when being connected to the power supply port of the vehicle and not to execute the charging processing for a safety reason when this voltage is lower than a specified lower limit voltage (for example, 50 V).

In this embodiment, a rated voltage (48 V) of the battery 18 is set lower than the lower limit voltage (50 V). However, the external power supply 17 obtains a total voltage of a battery voltage Vbatt and a capacitor voltage Vcap (that is, the voltage of the first power line 5a) as the voltage of the vehicle 1. Thus, in this embodiment, in the case where the total voltage is equal to or higher than the lower limit voltage, the external power supply 17 initiates the charging processing regardless of a magnitude of the battery voltage Vbatt. The control circuit 24 then controls the charging circuit 19, so as to be able to charge the battery 18 and the capacitor 22.

On the other hand, in the case where the total voltage (=Vbatt+Vcap) is lower than the lower limit voltage at the time when the external power supply 17 is connected to the power supply port 23, the external power supply 17 does not initiate the charging processing. In this case, the control circuit 24 controls the charging circuit 19, and boosts the capacitor voltage by using some of the electrical energy stored in the battery 18. At this time, since a stored electrical charge amount of the battery 18 is large, the battery voltage is hardly dropped. In this way, the total voltage can be boosted to be equal to or higher than the lower limit voltage.

Also, in a time other than the external charging (that is, during travel of the vehicle 1), in the case where the capacitor voltage becomes lower than the specified voltage due to discharging of the capacitor 22, the control circuit 24 can charge the capacitor 22 by using the power of the battery 18 prior to the power supply from the capacitor 22 to the secondary drive motors 20.

In the present specification, the rated voltage of the battery 18 means a maximum value (a full-charged voltage) of an actuation voltage under a general condition, and a rated voltage of the capacitor 22 means a maximum voltage (a full-charged voltage) set for the capacitor 22. In addition, an average actuation voltage of the battery at a time when the battery is discharged under the general condition is referred to as a nominal voltage of the battery. Furthermore, the rated voltage (48 V) of the battery 18 is set lower than the rated voltage (72 V) of the capacitor 22. However, the battery 18 is configured that an amount of the electric charges (an electrical quantity: coulomb) that can be stored therein is much larger than an amount of the electrical charges that can be stored in the capacitor 22.

Figure 4:
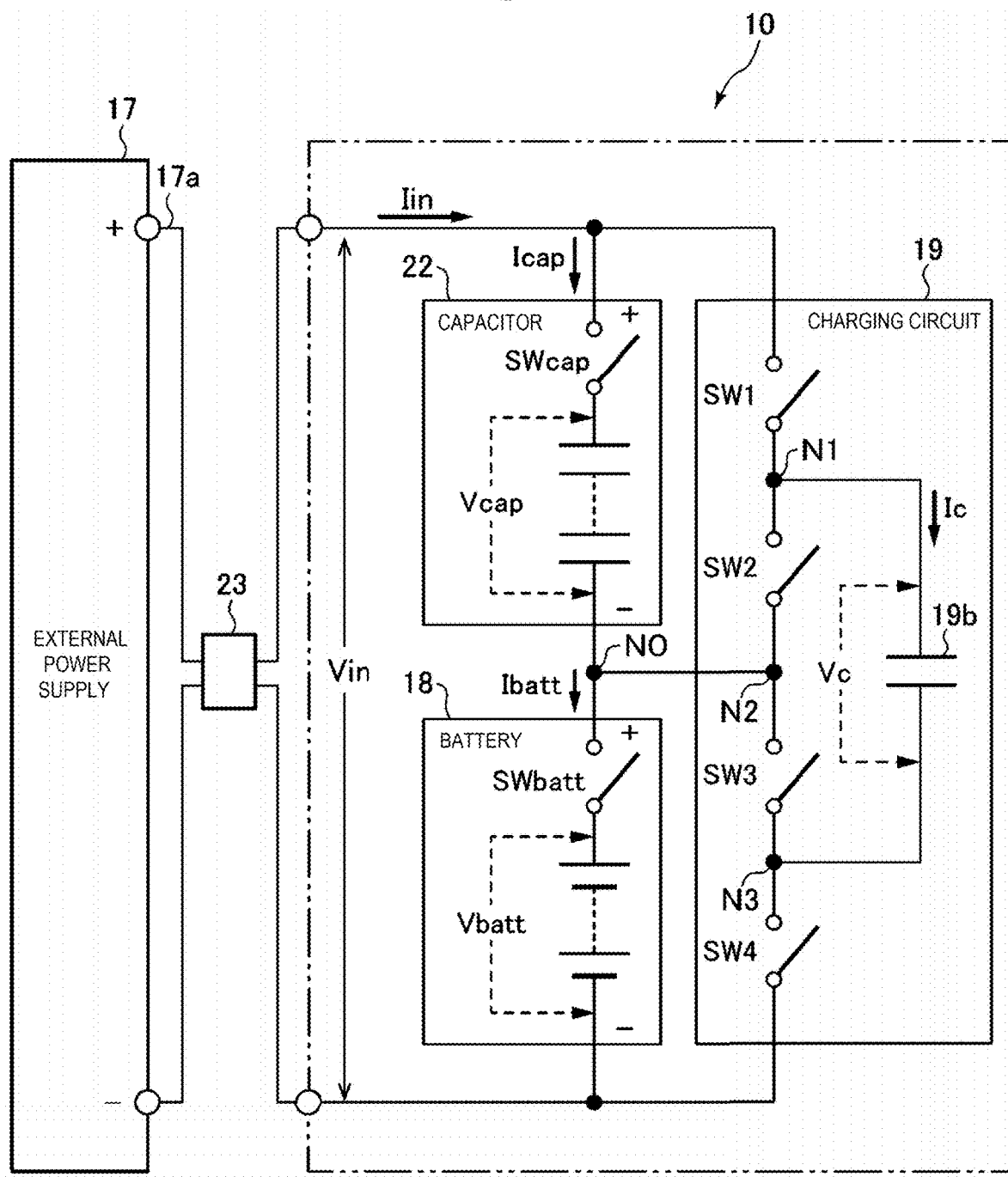
FIG. 4 is a diagram for illustrating electric circuits in a battery, a capacitor, and a charging circuit of the vehicle drive system according to the embodiment of the present disclosure.
Figure 5:
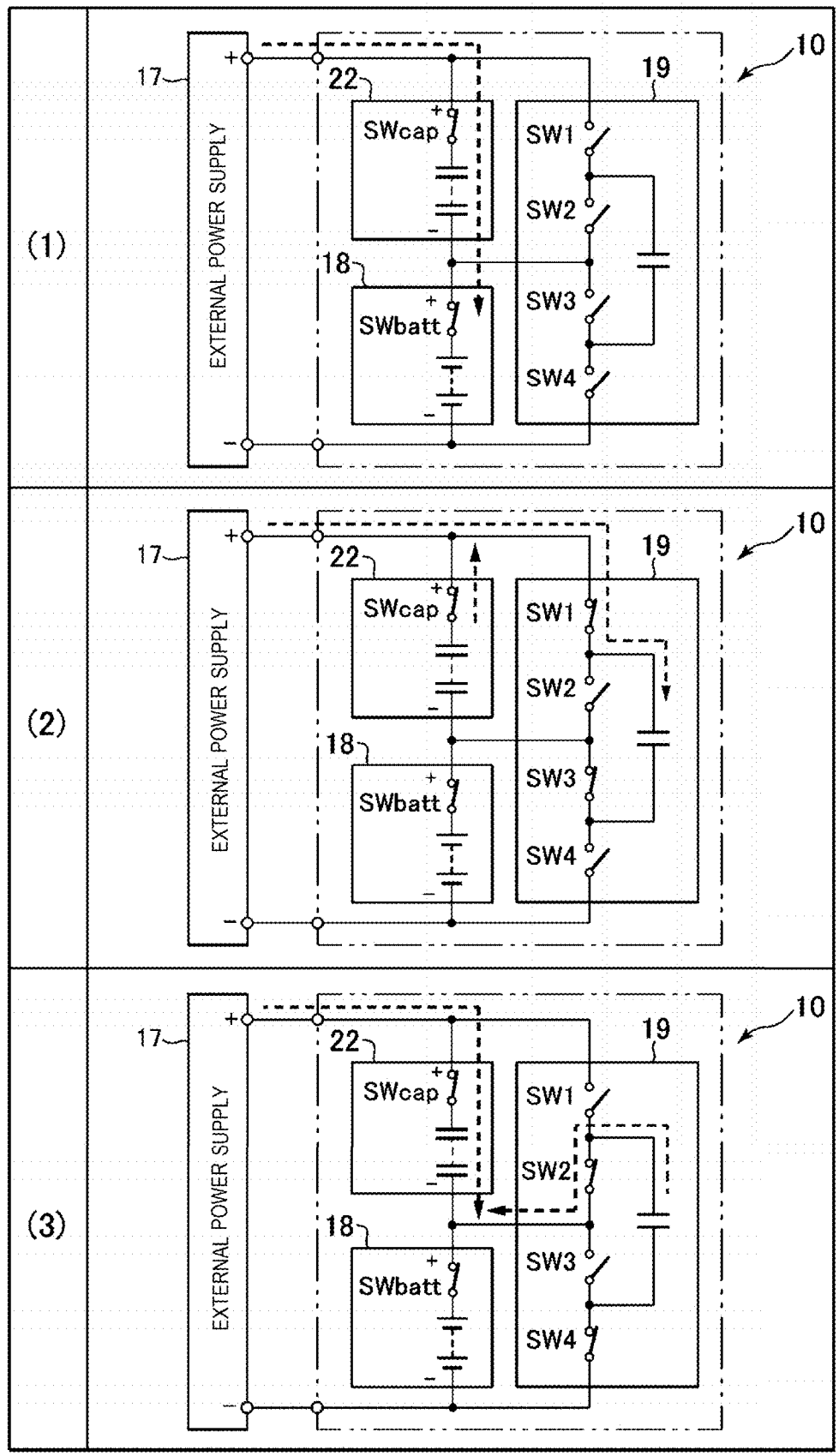
FIG. 5 includes diagrams illustrating opening/closing positions of electrical switches and a current at each stage during external charging of the vehicle drive system according to the embodiment of the present disclosure.
Figure 6:
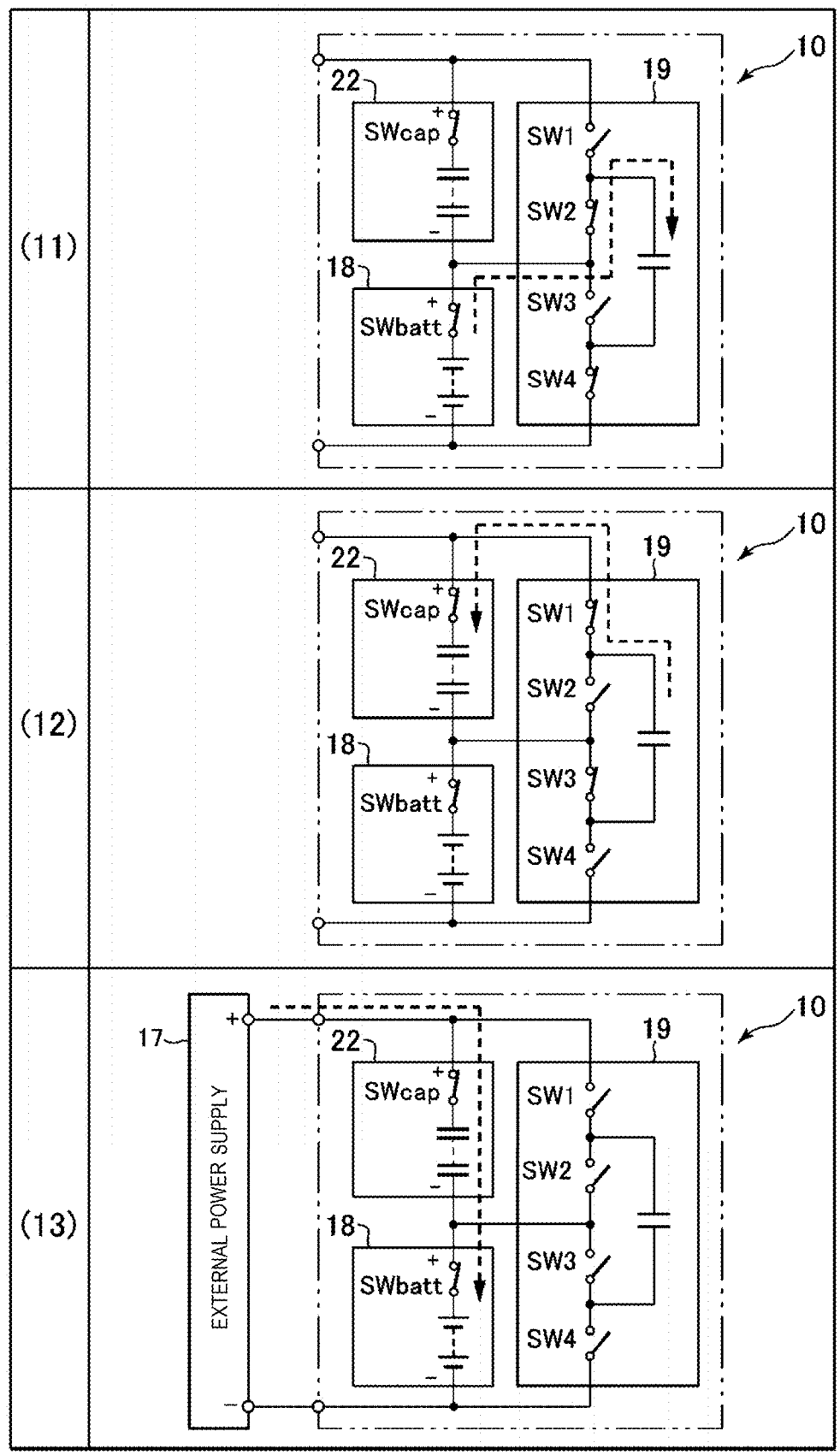
FIG. 6 includes diagrams illustrating the opening/closing positions of the electrical switches and the current at each stage during capacitor charging processing of the vehicle drive system according to the embodiment of the present disclosure.

Next, a description will be made on the charging processing of the vehicle drive system 10 according to the embodiment of the present disclosure with reference to FIG. 4 to FIG. 6. FIG. 4 is a diagram for illustrating electric circuits in the battery, the capacitor, and the charging circuit. FIG. 5 includes diagrams illustrating opening/closing positions of electrical switches and the current at each stage during the external charging. FIG. 6 includes diagrams illustrating the opening/closing positions of the electrical switches and the current at each stage during capacitor charging processing.

As illustrated in FIG. 4, a switch SWbatt is connected to the positive electrode terminal of the battery 18, a switch SWcap is connected to the positive electrode terminal of the capacitor 22, and connection/disconnection of each of the battery 18 and the capacitor 22 can thereby be switched.

The charging circuit 19 is connected in parallel with the battery 18 and the capacitor 22 that are connected in series. The charging circuit 19 includes four switches that are connected in series therein, and switches SW1, SW2, SW3, SW4 are connected in this order. One end of the switch SW1 is connected to the positive electrode terminal of the capacitor 22, and one end of the switch SW4 is connected to the negative electrode terminal of the battery 18 (the body ground G). A connection point N2 between the switches SW2, SW3 is connected to the connection point N0 between the battery 18 and the capacitor 22.

The control circuit 24 controls opening/closing of the switches SW1 to SW4, SWbatt, SWcap. Furthermore, a charging capacitor 19*b* is connected between a connection point N1 between the switches SW1, SW2 and a connection point N3 between the switches SW3, SW4. In this embodiment, a semiconductor switch is adopted as each of the switches. However, a relay using a mechanical contact may be used as each of the switches.

When the external power supply 17 is connected to the vehicle 1 for the external charging processing, the external power supply 17 charges the capacitor 22 and the battery 18 (stage (1) in FIG. 5). As a result, the capacitor voltage Vcap is boosted. Next, when the capacitor voltage Vcap is boosted for a specified value, the control circuit 24 brings the switches SW1, SW3 into closed states, and brings the switches SW2, SW4 into open states (stage (2) in FIG. 5). As a result, the electric charges stored in the capacitor 22 are released, a current Ic flows into the charging capacitor 19*b* in the charging circuit 19, and an inter-terminal voltage Vc of the charging capacitor 19*b* is boosted.

When the inter-terminal voltage Vc is boosted to a specified value, the control circuit 24 brings the switches SW1, SW3 into the open states, and brings the switches SW2, SW4 into the closed states (stage (3) in FIG. 5). As a result, the current from the external power supply 17 flows into the capacitor 22 and the battery 18, and the electric charges stored in the charging capacitor 19*b* also flow into the battery 18 through the switch SW2. In this way, the battery voltage Vbatt is boosted.

In this embodiment, the control circuit 24 alternately turns the switches SW1 to SW4 ON/OFF such that states at the stages (2) and (3) in FIG. 5 are alternately repeated. As a result, the voltage of the battery 18 can gradually be boosted by the electric charges that are temporarily stored in the capacitor 22. In addition, since the voltage of the capacitor 22 is also boosted, an input voltage (Vin=Vbatt+Vcap) is boosted as a whole. Just as described, in this embodiment, the external power supply 17 can be used to charge the battery 18 and the capacitor 22.

In the case where the input voltage (Vin) is lower than the lower limit voltage of the external power supply 17, the control circuit 24 boosts the capacitor voltage Vcap by using the power of the battery 18. At this time, a voltage drop amount of the battery 18 is smaller than a voltage boost amount of the capacitor voltage Vcap. Thus, the input voltage (Vin) is boosted as a whole. The control circuit 24 brings the switches SW1, SW3 into the open states, and brings the switches SW2, SW4 into the closed states (stage (11) in FIG. 6). As a result, the current flows from the battery 18 into the charging capacitor 19*b* through the switch SW2 (Ic>0). Next, when the inter-terminal voltage Vc of the charging capacitor 19*b* is boosted to a specified value, the control circuit 24 brings the switches SW1, SW3 into the closed states, and brings the switches SW2, SW4 into the open states (stage (12) in FIG. 6). In this way, the electric charges stored in the charging capacitor 19*b* are released and flow into the capacitor 22 (Icap>0). As a result, the voltage of the capacitor 22 is boosted.

In this embodiment, the control circuit 24 alternately turns the switches SW1 to SW4 ON/OFF such that states at the stages (11) and (12) in FIG. 6 are alternately repeated. As a result, the voltage of the capacitor 22 can gradually be boosted by using the electric charges of the battery 18. When the input voltage (Vin) reaches a specified external charging initiation threshold (>the lower limit voltage), the control circuit 24 brings the switches SW1 to SW4 into the open states (stage (13) in FIG. 6), and keeps executing the external charging processing illustrated in FIG. 5.

Next, a description will be made on operational effects of the vehicle drive system 10 according to the embodiment of the present disclosure.

According to this embodiment, the vehicle drive system 10, which is mounted on the vehicle 1, includes: the secondary drive motors 20 (first vehicle drive motors) and the primary drive motor 16 (second vehicle drive motor) for driving the vehicle 1; the battery 18 that includes the plural battery cells 18*a* connected in series; the capacitor 22 that is connected in series with the battery 18; the first power line 5*a* that supplies the total voltage (Vin) of the battery voltage Vbatt supplied from the battery 18 and the capacitor voltage Vcap supplied from the capacitor 22 to the secondary drive motors 20; the second power line 5*b* that supplies the battery voltage Vbatt to the primary drive motor 16; and the third power line 5*c* that supplies the cell voltage of at least one battery cell 18*a* of the plural battery cells 18*a* to the on-board electrical equipment 28 of the vehicle 1, and the first power line 5*a*, the second power line 5*b*, and the third power line 5*c* are configured that the battery voltage Vbatt is higher than the cell voltage and that the total voltage (Vin) is higher than the battery voltage Vbatt.

In this embodiment that is configured as described above, the power supply 3 includes the in-series connection between the battery 18 and the capacitor 22, and also includes: the first power line 5*a* connected to the capacitor 22; the second power line 5*b* connected to the battery 18; and the third power line 5*c* supplying the cell voltage from the at least one battery cell 18*a* in the battery 18. The second power line 5*b* is directly provided by the battery 18, and the third power line 5*c* is directly provided by the at least one battery cell 18*a* in the battery 18. Furthermore, the first power line 5*a* is directly provided by the total voltage of the battery 18 and the capacitor 22. Just as described, in this embodiment, a DC/DC converter does not have to be provided, and the three power supply voltages can be supplied with the easy and simple configuration.

In this embodiment, each of the secondary drive motors 20 is preferably the in-wheel motor that is mounted on the wheel (the front wheel 2*b*) of the vehicle 1. In this embodiment that is configured as described above, each of the secondary drive motors 20 can be actuated by the high voltage that is the total voltage of the battery 18 and the capacitor 22. Just as described, in this embodiment, there is no need to obtain the high voltage by boosting the battery voltage Vbatt by the DC/DC converter.

In this embodiment, the primary drive motor 16 is preferably mounted on the body of the vehicle 1 and preferably provides the drive power to the wheels (the rear wheels 2*a*) of the vehicle 1 via the power transmission mechanism 14. In this embodiment that is configured as described above, the primary drive motor 16 can be actuated by the battery 18 that can easily be designed to have larger capacity as the power supply than the capacitor 22. In this embodiment, it may be configured that the secondary drive motors 20 drive the rear wheels 2*a* and that the primary drive motor 16 drives the front wheels 2*b*.

In this embodiment, the third power line 5*c* is preferably the accessory power supply. In this embodiment that is configured as described above, the cell voltage that is provided by the at least one battery cell 18*a* in the battery 18 can be used as the accessory power supply. Just as described, in this embodiment, there is no need to obtain the low voltage by dropping the battery voltage Vbatt by the DC/DC converter.

In this embodiment, the third power line 5c is preferably provided with the switch 18c that is used to electrically connect/disconnect the at least one battery cell 18a to/from the on-board electrical equipment 28. Just as described, in this embodiment, it is possible to electrically connect/disconnect the at least one battery cell to/from the on-board electrical equipment with the simple configuration.

DESCRIPTION OF REFERENCE SIGNS AND NUMERALS

1: Vehicle
3: Power supply
5a: First power line
5b: Second power line
5c: Third power line
10: Vehicle drive system
16: Primary drive motor (second vehicle drive motor)
17: External power supply
18: Battery
18a: Battery cell
19: Charging circuit
19b: Charging capacitor
20: Secondary drive motor (first vehicle drive motor)
22: Capacitor
24: Control circuit
28: Electrical load
G: Body ground
N0, N1, N2, N3: Connection point
SWbatt, SWcap: Switch
SW1 to SW4: Switch

The invention claimed is:

1. A vehicle drive system mounted on a vehicle, the vehicle drive system comprising:
a first vehicle drive motor and a second vehicle drive motor;
a battery that includes plural battery cells connected in series;
a capacitor that is connected in series with the battery;
a first power line that supplies a battery voltage supplied from the battery to a first vehicle drive motor; and
a second power line that supplies to a second vehicle drive motor a total aggregate voltage of the battery voltage and a capacitor voltage supplied from the capacitor;
a third power line that supplies a cell voltage of at least one battery cell of the plural battery cells to on-board electrical equipment of the vehicle, wherein
the battery voltage being higher than the cell voltage, and the total aggregate voltage being higher than the battery voltage.

2. The vehicle drive system according to claim 1, wherein the second vehicle drive motor is an in-wheel motor that is mounted on a wheel of the vehicle.

3. The vehicle drive system according to claim 1, wherein the first vehicle drive motor is mounted on the vehicle and provides drive power to a wheel of the vehicle via a power transmission mechanism.

4. The vehicle drive system according to claim 1, wherein the third power line provides power to serve as an accessory power supply.

5. The vehicle drive system according to claim 1, wherein the third power line includes a switch configured to electrically connect/disconnect the at least one battery cell to/from the on-board electrical equipment.

6. The vehicle drive system according to claim 2, wherein the first vehicle drive motor is mounted on the vehicle and provides drive power to a wheel of the vehicle via a power transmission mechanism.

7. The vehicle drive system according to claim 4, wherein the third power line includes a switch configured to electrically connect/disconnect the at least one battery cell to/from the on-board electrical equipment.

8. The vehicle drive system according to claim 1, wherein the second vehicle drive motor provides drive power to one of the front wheels to serve as a secondary drive wheel.

9. The vehicle drive system according to claim 8, wherein the second power line is configured to provide power to another second vehicle drive motor that is another in-wheel motor and is accommodated in a wheel rim of another of the front wheels to serve an another secondary drive wheel.

10. The vehicle drive system according to claim 8, wherein
the first vehicle drive motor is an electric motor that generates the drive power to drive primary drive wheels of the vehicle.

11. The vehicle drive system according to claim 10, wherein
the first vehicle drive motor is provided on the vehicle adjacent to a vehicle engine and behind the vehicle engine.

12. The vehicle drive system according to claim 1, wherein
the first vehicle drive motor is an electric motor that generates the drive power to drive primary drive wheels of the vehicle.

13. The vehicle drive system according to claim 12, wherein
the first vehicle drive motor is provided on the vehicle adjacent to a vehicle engine and behind the vehicle engine.

14. The vehicle drive system according to claim 1, further comprising:
a controller configured to control a vehicle engine, the first vehicle drive motor, and the second vehicle drive motor during execution of a motor driven mode of operation, and an internal combustion engine mode of operation.

15. The vehicle drive system according to claim 1, wherein
the battery voltage being less than 50 VDC, and the total aggregate voltage being at least twice the battery voltage.

16. The vehicle drive system according to claim 15, wherein
total aggregate voltage being substantially 120 VDC, and the battery voltage being substantially 48 VDC.

17. The vehicle drive system according to claim 15, further comprising:
an inverter configured to covert at least one of the battery voltage and the total aggregate voltage to AC before being applied to one of the first vehicle drive motor and the second vehicle drive motor.

18. The vehicle drive system according to claim 1, wherein the first power line supplies the battery voltage supplied from the battery to the first vehicle drive motor without using a DC/DC converter to change a voltage level.

19. The vehicle drive system according to claim 1, wherein the second power line supplies the battery voltage supplied from the batter to the second vehicle drive motor without using a DC/DC converter to change a voltage level.

\* \* \* \* \*